United States Patent
Okushima et al.

(10) Patent No.: US 6,486,632 B2
(45) Date of Patent: Nov. 26, 2002

(54) CONTROL DEVICE FOR MOTOR/GENERATORS

(75) Inventors: Keiji Okushima, Yokohama (JP); Yasuhiko Kitajima, Kamakura (JP); Shinichiro Kitada, Tokyo (JP); Toshio Kikuchi, Yokosuka (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/910,028

(22) Filed: Jul. 23, 2001

(65) Prior Publication Data

US 2002/0027789 A1 Mar. 7, 2002

(30) Foreign Application Priority Data

Sep. 4, 2000 (JP) ........................................ 2000-266899

(51) Int. Cl.[7] .............................................. G05B 11/28
(52) U.S. Cl. .......................... 318/599; 318/811; 318/41; 318/77; 318/85; 318/151; 318/801; 363/71; 363/132; 363/97; 363/56.02; 363/41
(58) Field of Search ............................... 318/41, 77, 85, 318/151, 700, 705, 798, 801, 811; 363/41, 77, 132, 56.02, 97

(56) References Cited

U.S. PATENT DOCUMENTS 4,825,144 A * 4/1989 Alberkrack et al. ........ 323/272
5,142,468 A * 8/1992 Nerem ........................ 363/71
5,414,339 A * 5/1995 Masaki et al. .............. 318/800
5,669,842 A * 9/1997 Schmidt ........................ 475/5
5,712,540 A * 1/1998 Toda et al. .................... 318/46
6,337,803 B2 * 1/2002 Kikuchi et al. ............. 363/131

FOREIGN PATENT DOCUMENTS

JP    2000-78850    3/2000

* cited by examiner

*Primary Examiner*—Marlon T. Fletcher
*Assistant Examiner*—Rina I. Duda
(74) *Attorney, Agent, or Firm*—Foley & Lardner

(57) ABSTRACT

A controller for motor/generators is proposed which allows reductions in ripple current generated by an inverter driving a power-generating motor/generator and a vehicle-driving motor/generator. The control device for motor/generators has a first inverter which supplies a control current to a first motor/generator used mainly as an electrical motor, a second inverter which supplies a control current to a second motor/generator used mainly as a generator, a first PWM signal generating circuit which drives the switching elements of the first inverter based on a first carrier signal, a second PWM signal generating circuit which drives the switching elements of the second inverter based on a second carrier signal which has the same period of the first carrier signal. The first inverter and the second inverter are controlled so that the operation of the first inverter is synchronized with the operation of the second inverter and the current of the first inverter which flows in the DC bus line is generated in opposite direction to the current of the second inverter which flows in the DC bus line.

7 Claims, 6 Drawing Sheets

CONTROL DEVICE FOR MOTOR/GENERATORS

FIELD OF THE INVENTION

This invention relates to a control device for motor/generators used in a hybrid vehicle.

BACKGROUND OF THE INVENTION

One type of hybrid vehicle mounts two motor/generators. One of the motor/generators is used for running the vehicle (hereafter referred to as "the vehicle-running motor/generator") with the other being used for the generation of electrical power (hereafter referred to as "the power-generating motor/generator"). The two motor/generators are operated by a common direct-current power source. An inverter and a circuit generating a pulse width modulation (PWM) signal are provided in each of the motor/generators. The vehicle-running motor/generator is rotated and driven by an alternating current converted from the direct current by the inverter. The power-generating motor/generator is rotated by the prime mover, that is to say, by the engine and generates an alternating current. The resulting alternating current is converted to a direct current and stored in a battery by switching elements of the inverter.

Since the switching elements of the inverter which drives the AC motor perform switching operations at high frequencies of 10–20 kHz, high frequency electrical noise is generated by a pulse-shaped ripple current generated in the DC bus lines.

As a result, a solution is required for the detrimental effects of such high frequency noise on nearby electrical components. Normally a noise-reducing reactor functioning as a noise filter or a smoothing electrolytic condenser which can resist large ripple currents is disposed between the switching circuit of the inverter and the DC power source. However since this solution requires the use of large components such as a large capacity reactor and an electrolytic condenser, problems arise which are related to weight increases and the fact that the size of the inverter case must be increased. The above problem is exacerbated by the fact that as stated above two or more inverters are mounted in a hybrid automobile.

Tokkai 2000-78850 published by the Japanese Patent Office in 2000 discloses a controller for motor/generators which suppresses ripple current by shifting the ON-OFF timing of the switching element.

SUMMARY OF THE INVENTION

However since pulses generated by the vehicle-running motor/generator and pulses in the opposite direction generated by the power-generating motor/generator are alternately applied to the DC bus lines, it is not possible for the controller to effectively reduce ripple currents resulting in high-frequency electrical noise.

This invention has the object of providing a control device for motor/generators which effectively reduces ripple current. In order to achieve above objects, this invention provides a control device for motor/generators.

The control device for motor/generators comprises; a first inverter connected to a direct-current (DC) power source through DC bus lines, the first inverter applying a control current to a first motor/generator which is used mainly as a motor; a second inverter connected to the direct-current power source through the DC bus lines, the second inverter applying a control current to a second motor/generator which is used mainly as a generator, the second inverter having the same configuration of switching elements as the first inverter; a first PWM signal generating circuit comparing a first carrier signal limiting the operational frequency of the first inverter with a first voltage command signal for establishing a desired control current of the first motor/generator, the first PWM signal generating circuit generating pulse width modulation (PWM) signals each operating one of the switching elements of the first inverter; and a second PWM signal generating circuit for comparing a second carrier signal with a second voltage command signal and generating pulse width modulation (PWM) signals each operating one of switching elements of the second inverter, the second carrier signal having the same period as the first carrier signal and limiting the operational frequency of the second inverter, the second voltage command signal establishing a desired control current of the second motor/generator.

The first PWM signal generating circuit and the second PWM signal generating circuit control the first inverter and the second inverter respectively so that the operation of the first inverter is synchronized with the operation of the second inverter and so that the current of the first inverter which flows in the DC bus lines flows in an opposite direction to the current of the second inverter which flows in the DC bus line.

The details as well as other features and advantages of this invention are set forth in the remainder of the specification and are shown in the accompanying drawings.

DESCRIPTION OF THE PREFERRED EMBODIMENTS

Figure 1:
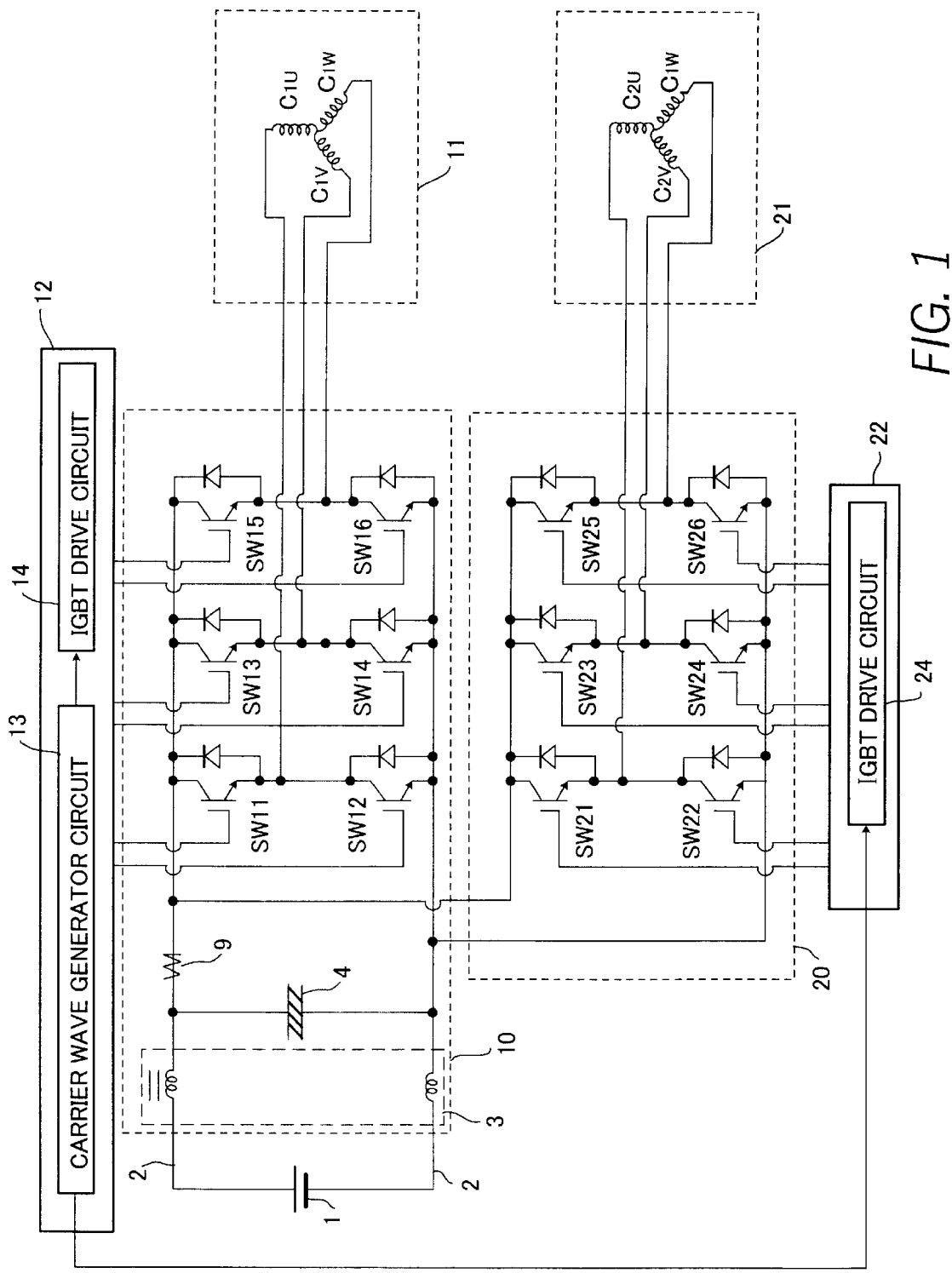
FIG. 1 is a schematic circuit diagram of a control device for motor/generators according to a first embodiment of this invention.

A control circuit for motor/generators according to a first embodiment of this invention will be described hereafter with reference to the schematic circuit diagram shown in FIG. 1.

A DC current from a battery 1 is supplied to a first inverter (vehicle-driving inverter) 10 through DC bus lines, that is to say, through power cables 2. The power cable 2 has a reactance component. The size of the in-rush current resulting from the ON/OFF switching of the switching elements affects the size of the ripple current generated by the inverter.

The vehicle-running motor/generator (first motor/generator) 11 for driving a vehicle has three stator coils (Clu, Clv, Clw) with respective phases of U, V and W. A rotor (not shown) is provided on an inner side of these stator coils. The first inverter 10 which is connected to the vehicle-running motor/generator comprises a noise filter 3 eliminating noise, a smoothing condenser (for example, an electrolytic condenser) 4 and six switching elements (for example, IGBT elements (Insulated Gate Bipolar Transistors)) sw11–sw16.

The switching elements of the first inverter 10 are provided in pairs with the sw11 collector connected to the positive terminal of the battery 1 and the sw12 emitter connected to the negative terminal of the battery 1. The sw11 emitter and the sw12 collector are interconnected. The U-phase stator coil Clu of the vehicle-running motor/generator 11 is connected to the sw11 emitter (sw12 collector). In the same manner, sw13 and sw14 comprise a pair and are connected to the V-phase stator coil Clv of the vehicle-running motor/generator 11. Sw15 and sw16 comprise a pair and are connected to the W-phase stator coil Clw of the vehicle-running motor/generator 11.

The switching elements sw11–sw16 are turned ON/OFF by PWM signals generated by a first inverter control circuit (vehicle-running motor controller) 12 which controls the first inverter 10. The first inverter control circuit 12 is provided with a carrier wave generator circuit 13 which generates a first carrier signal (triangular wave) determining the switching period of the switching elements sw11–sw16 of the first inverter 10, and a first IGBT drive circuit (first PWM signal generating circuit) 14 which generates first PWM signals (vehicle-running PWM signals) based on the first carrier signal generated by the carrier wave generator circuit 13. Each of the first PWM signals is applied to one of the switching elements sw11–sw16.

A second inverter (power-generating inverter) 20 has substantially the same circuit configuration as the first inverter, i.e. it is provided with switching elements sw21–sw26 connected in the same configuration as those of the first inverter 10. The second inverter drives a power-generating motor/generator (second motor/generator) 21 of the same structure as the vehicle-running motor/generator 11. In the first embodiment, the pole number and coil number of the power-generating motor/generator 21 and the vehicle-running motor/generator 11 are equal. However in other embodiments, the pole number and coil number of both motor/generators 11, 21 may be different.

The second inverter 20 branches at the DC bus lines between the switching elements sw11–sw16 and the smoothing condenser 4 of the first inverter 10. The second inverter 20 is connected to the battery 1 through a noise filter 3 and the smoothing condenser 4 which are provided in the first inverter 10.

A second inverter control circuit (power-generating motor controller) 22 controls the second inverter 20. A second IGBT drive circuit (second PWM generating circuit) 24 in the second inverter control circuit 22 generates second PWM signals (power-generating PWM signals) and turns the switching elements sw21–sw26 ON and OFF. Each of the second PWM signals is applied to one of the switching elements sw21–sw26.

In the present invention, a second carrier signal supplied to the second IGBT drive circuit 24 in the second inverter control circuit 22 has the same frequency (that is to say, the same period) as the first carrier signal supplied to the first IGBT drive circuit 14 of the first inverter control circuit 12. In the first embodiment, the first carrier signal and the second carrier signal are both generated from the carrier wave generator circuit 13 in the inverter control circuit 12. Thus the first inverter 10 and the second inverter 20 are synchronized by the same carrier signal.

The DC current supplied from the battery 1 to the first inverter 10 passes through a noise filter 3 for reducing noise components. Thereafter the current is supplied to the switching elements sw11–sw16 through the smoothing condenser 4. Almost no ripple current flows in the DC bus lines between the smoothing condenser 4 and the battery 1 as a result of the smoothing effect of the smoothing condenser 4. However since a pulse-shaped current is generated in response to the ON/OFF switching of the switching elements sw11–sw16, a ripple current comprising the total of the polarity (three phases) of the vehicle-running motor flows in the DC bus lines between the smoothing condenser 4 and the switching elements.

In the present invention, the switching elements sw21–sw26 of the second inverter 20 in parallel with the switching elements sw11–sw16 of the first inverter 10 are connected to the DC bus lines which connect the smoothing condenser 4 and the switching element sw11–sw16. As a result, a current corresponding to the total of the currents flowing in the first inverter 10 and the current flowing in the second inverter 20 flows in the common DC bus lines which are from the connection point of the DC bus lines of the first inverter 10 and the DC bus lines of the second inverter 20 up to the battery 1.

Since the switching elements of both the first inverter 10 and the second inverter 20 are turned ON/OFF in response to the ON/OFF timing of a carrier signal generated by the carrier wave generator circuit 13 in the first inverter control circuit 12, the first inverter 10 and the second inverter 20 operate with the same switching timing. Therefore when one of the switching elements of the first inverter 10 is turned ON and a plus current flows in the DC bus lines of the first inverter 10, the corresponding switching element of the second inverter 20 is also turned ON and a minus current flows in the DC bus lines of the second inverter 20. Here, sw11 corresponds to sw21, sw12 to sw22, sw13 to sw23, sw14 to sw24, sw15 to sw25, and sw16 to sw26. As a result, the plus current from the first inverter 10 cancels out the minus current from the second inverter 20 in the common DC bus lines.

In the first embodiment, the first inverter control circuit 12 and the second inverter control circuit 22 generate PWM signals based on a carrier signal generated by a common carrier generator circuit 13. Thus the first and second carrier signals operate with the same phase and period for the two inverters 10, 20. However although the two carrier signals must have the same period, it is not necessary for them to have the same phase. For example, it is possible to use two triangular waves with mutually opposite phases as the carrier signals by using an IGBT with opposite characteristics. Furthermore it is possible to use two triangular waves with the same period and shifted phases as the carrier signals by shifting the operational point of the IGBT.

Figure 2A:
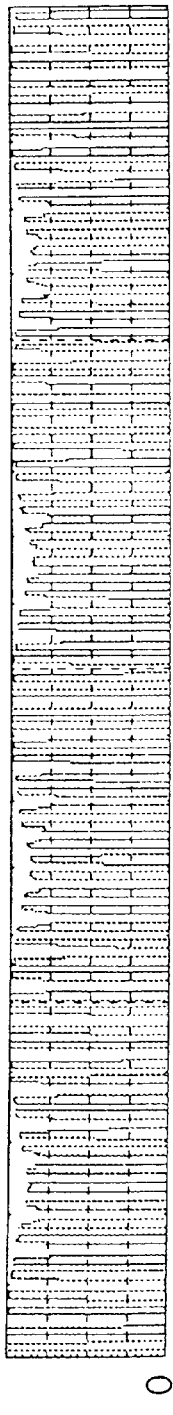
FIG. 2A shows a ripple current generated by a vehicle-running inverter in the control device for the motor/generators according to a first embodiment.
Figure 2B:
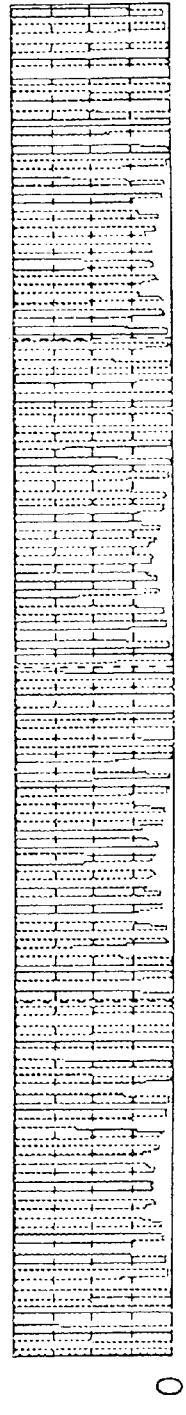
FIG. 2B shows a ripple current generated by a power-generating inverter in the control device for the motor/generators according to the first embodiment.
Figure 2C:
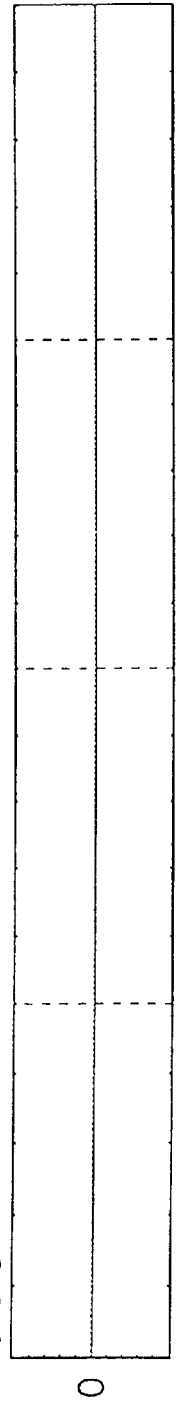
FIG. 2C shows the total of the ripple currents.
Figure 2D:
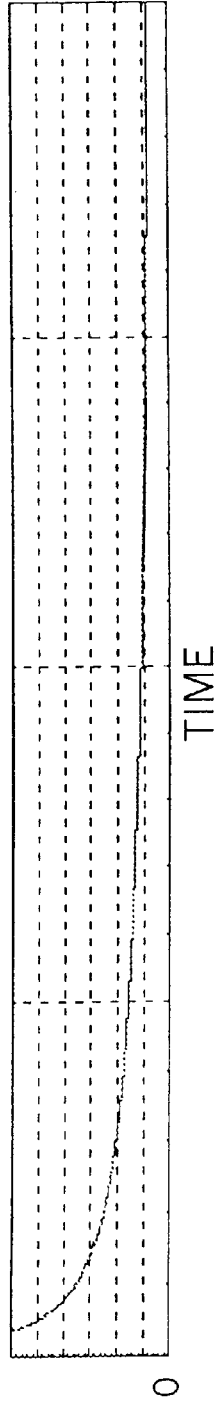
FIG. 2D shows a value representing the conversion of the total ripple current to a root-mean-square value.

The ripple current waveform flowing in the DC bus lines of the drive circuit of the motor/generators according to a first embodiment will be described below with reference to FIGS. 2A–2B. FIGS. 2A–2B shows a ripple current waveform obtained in a simulation. In FIGS. 2A–2B, the horizontal axis represents time and the vertical axis represents current. FIG. 2A shows a ripple current generated by the first inverter 10. FIG. 2B shows a ripple current generated by the second inverter 20. FIG. 2C shows a ripple current representing the total of the above ripple currents. FIG. 2D shows a value representing the conversion of the total ripple current to a root-mean-square value. In FIG. 2D, the horizontal axis is enlarged in comparison to the scale of the horizontal axis of FIG. 2C.

As shown in FIGS. 2A and 2B, the ripple current generated by the first inverter 10 and the ripple current generated by the second inverter 20 take equal values and flow in opposite directions. Thus as shown in FIG. 2C, the total of the above ripple currents takes a value close to zero ampere (OA).

As stated above, in the first embodiment, the first inverter 10 and the second inverter 20 operate the switching of the switching elements at a timing which is limited by carrier signals generated by the same carrier wave generator circuit 13. As a result, when a plus current is applied to the first inverter 10, a minus current flows in the second inverter 20. Thus a plus current for vehicle running and a minus current for power generation flow in the common DC bus lines of the first inverter 10. Therefore almost no ripple current is generated in the common DC bus lines.

Figure 3:
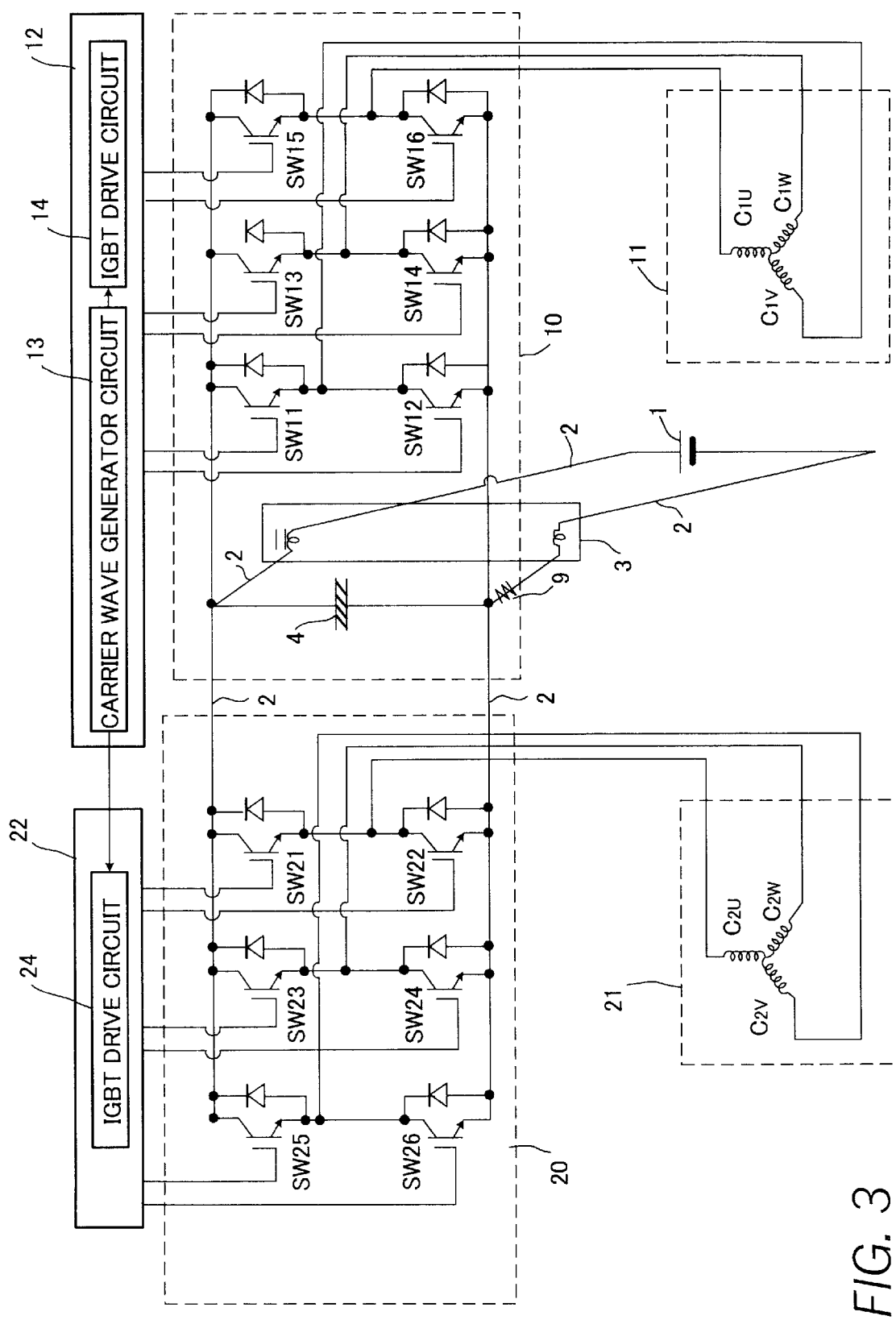
FIG. 3 is a schematic circuit diagram of a control device for motor/generators according to a second embodiment of this invention.

A control circuit for motor/generators according to a second embodiment of this invention will be described hereafter with reference to FIG. 3. In FIG. 3, since components such as the first and second inverters 10, 20, the motor/generators 11, 21 and the inverter control circuits 12, 22 are the same, they have been designated by the same reference numerals and additional description will be omitted.

The switching elements sw11–sw16 of the first inverter 10 are disposed on the right side of FIG. 3 about the smoothing condenser 4 with the switching elements sw21–sw26 of the second inverter 20 being disposed on the left side. The switching elements sw11–sw16 and the switching elements sw21–sw26 are disposed so that the length of the route allowing current flow between the switching elements sw11–sw16 of the first inverter 10 and the smoothing condenser 4 is approximately equal to the length of the route allowing current flow between the switching elements sw21–sw26 of the second inverter 20 and the smoothing condenser 4. For example, the route between sw11 and the condenser 4 has almost the same length as the route between sw21 and the condenser 4.

In the second embodiment, the battery 1 and the inverters are connected by a power cable 2 in the same manner as the first embodiment above. The power cable 2 has an inductance which is proportional to the length of the cable. As a result, the inductance of the electrical cable 2 from the smoothing condenser 4 to each of the switching elements of the first inverter 10 is approximately equal to the inductance from the smoothing condenser 4 to the corresponding switching element of the second inverter 20. Here, sw11 corresponds to sw21, sw12 to sw22, sw13 to sw23, sw14 to sw24, sw15 to sw25, and sw16 to sw26.

Furthermore in this invention, since each of the switching elements of the first inverter 10 and the corresponding switching element of the second inverter is simultaneously turned ON and OFF, a surge voltage resulting from the in-rush current of the ON/OFF switching of the switching elements, is generated simultaneously in opposite directions. Thus the surge voltages generated as a result of switching of both inverters 10, 20 in the DC bus lines cancel out.

As shown above, reductions in the surge voltage generated by the inductance of the power cable 2 reduces the possibility of component failure in the smoothing condenser 4 and the switching elements sw11–sw16, sw21–sw26. Furthermore it is possible to reduce the size and the cost of the smoothing condenser 4 and the switching elements sw11–sw16, sw21–sw26.

In this invention, it is preferred that the fundamental frequency (that is to say, the frequency of the fundamental wave) of a first control current for controlling the rotational state of the rotor of the vehicle-running motor/generator 11 is equal to the fundamental frequency of a second control current for controlling the generated power from the power-generating motor/generator 21. The first control current flows in the stator coils (C1u, C1v, C1w) of the vehicle-running motor/generator 11 and the second control current flows in the stator coils (C2u, C2v, C2w) of the power-generating motor/generator 21. In other words, it is preferred that the product of the rotation speed and the number of magnetic poles in the vehicle-running motor/generator 11 is equal to that in the power-generating motor/generator 21.

This is because the waveform of the ripple current is determined by the frequency of the ON/OFF switching of the switching elements and the fundamental frequency of a control current.

The necessity and effect of making the fundamental frequency of the first control current equal the fundamental frequency of the second control current will be described below with reference to FIG. 4.

Figure 4:
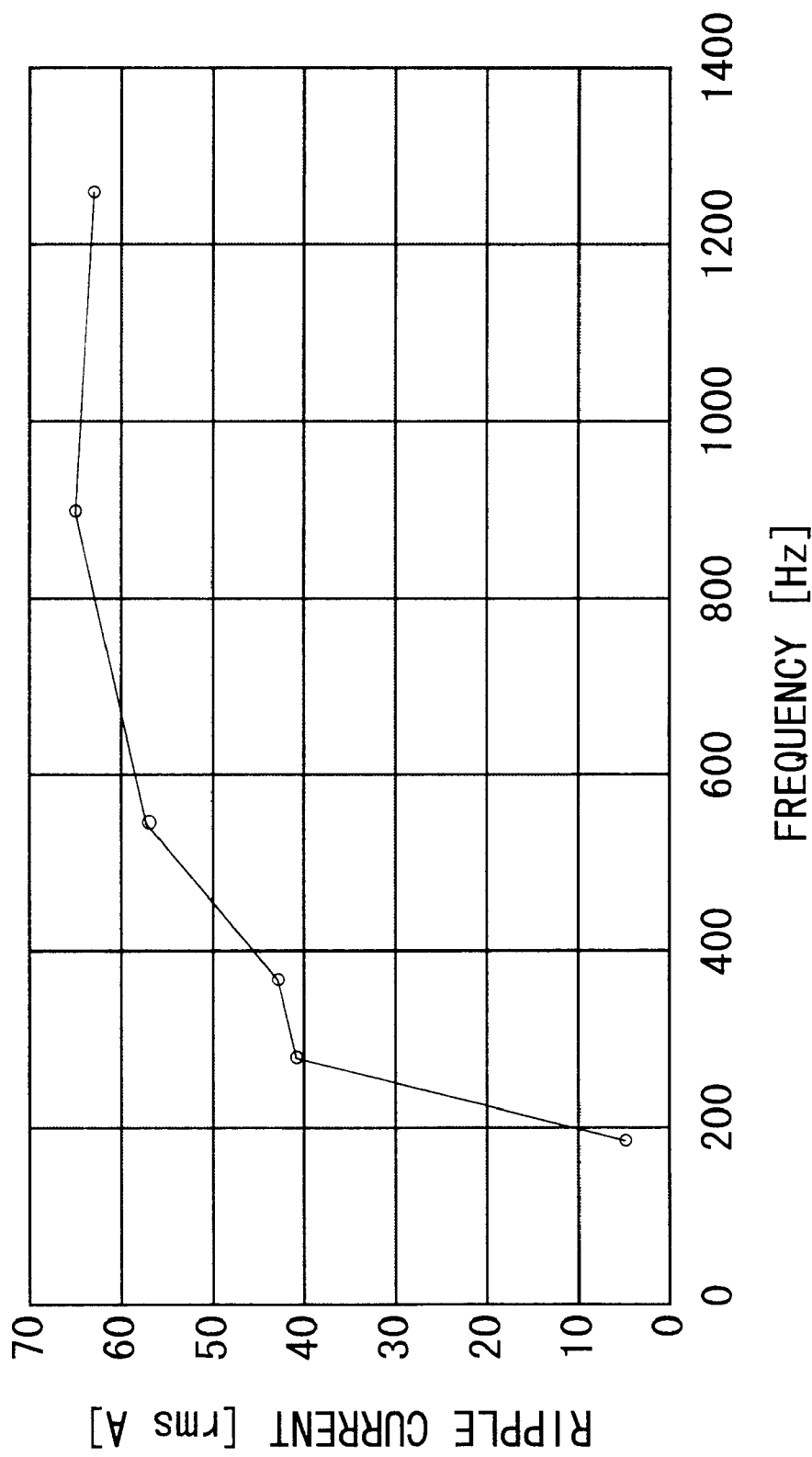
FIG. 4 shows variations in the root-mean-square value of the total ripple current resulting from the change in the fundamental frequency of a control current of the power-generating motor/generator according to the embodiments of this invention.

FIG. 4 shows the relationship of the root-mean-square value of the ripple current and the deviation of the fundamental frequency of the control current between the vehicle-running motor/generator 11 and the power-generating motor/generator 21. The fundamental frequency of the control current of the power-generating motor/generator 21 is shown on the horizontal axis and the root-mean-square value (graduations of 10A) of the ripple current of the inverter is shown on the vertical axis. The fundamental current of the control current of the vehicle-running motor/generator 11 is fixed at 180 Hz.

When the fundamental frequency of the control current of the power-generating motor/generator 21 is equal to the 180 Hz fundamental frequency of the control current of the vehicle-running motor/generator 11, the root-mean-square value of the ripple current in the DC bus lines is a small value of approximately 5A. The ripple current is reduced as a result of making the fundamental frequency of the control current of the power-generating motor/generator 21 equal that of the vehicle-running motor/generator 11.

However when the fundamental frequency of the control current of the power-generating motor/generator 21 is 900 Hz (five times that of the fundamental frequency of the control current of the vehicle-running motor/generator 11), a ripple current is generated which is approximately 65 A and almost no reduction in the ripple current is seen. The above facts indicate that an effective reduction in the ripple current is achieved by controlling the fundamental frequency of the control current of the power-generating motor/generator 21 to the fundamental frequency of the control current of the vehicle-running motor/generator 11.

However since the frequency of the fundamental wave of the control current is proportional to the rotation speed of the motor/generator, it is difficult to equalize the frequency of the fundamental wave of the two control currents while the rotation speed of the respective motor/generators is controlled arbitrarily.

Even when each rotation speed of the motor/generators is controlled separately, it is necessary that the frequencies of the fundamental waves of the control currents do not undergo a large deviation. Therefore, in this invention, it is preferred that the product of the pole number of the motor/generator and the maximum rotation speed which represents efficient rotation speeds of the performance range of rotation speeds of the motor/generators is approximately equal in both the vehicle-running motor/generator 11 and the power-generating motor/generator 21.

Generally the maximum rotation speed of the gasoline reciprocating engine which is used as a driving engine for the power-generating motor/generator 21 is approximately 6000 rpm. When the vehicle-running motor/generator 11 has a maximum rotation speed of 12000 rpm and four pairs of magnetic poles, it is possible to equalize the fundamental frequency of the control currents when the respective motor/generators are rotated at a maximum rotation speed by setting the power-generating motor/generator 21 to have eight pairs of magnetic poles.

As shown above, when a number of pairs of magnetic poles is determined which is proportional to the ratio of the inverse of the maximum rotation speed of the two motor/generators 11, 21, it is possible to increase the opportunities for the fundamental frequencies in the control currents of the two motor/generators 11, 21 to become equal or near to equal.

Figure 5:
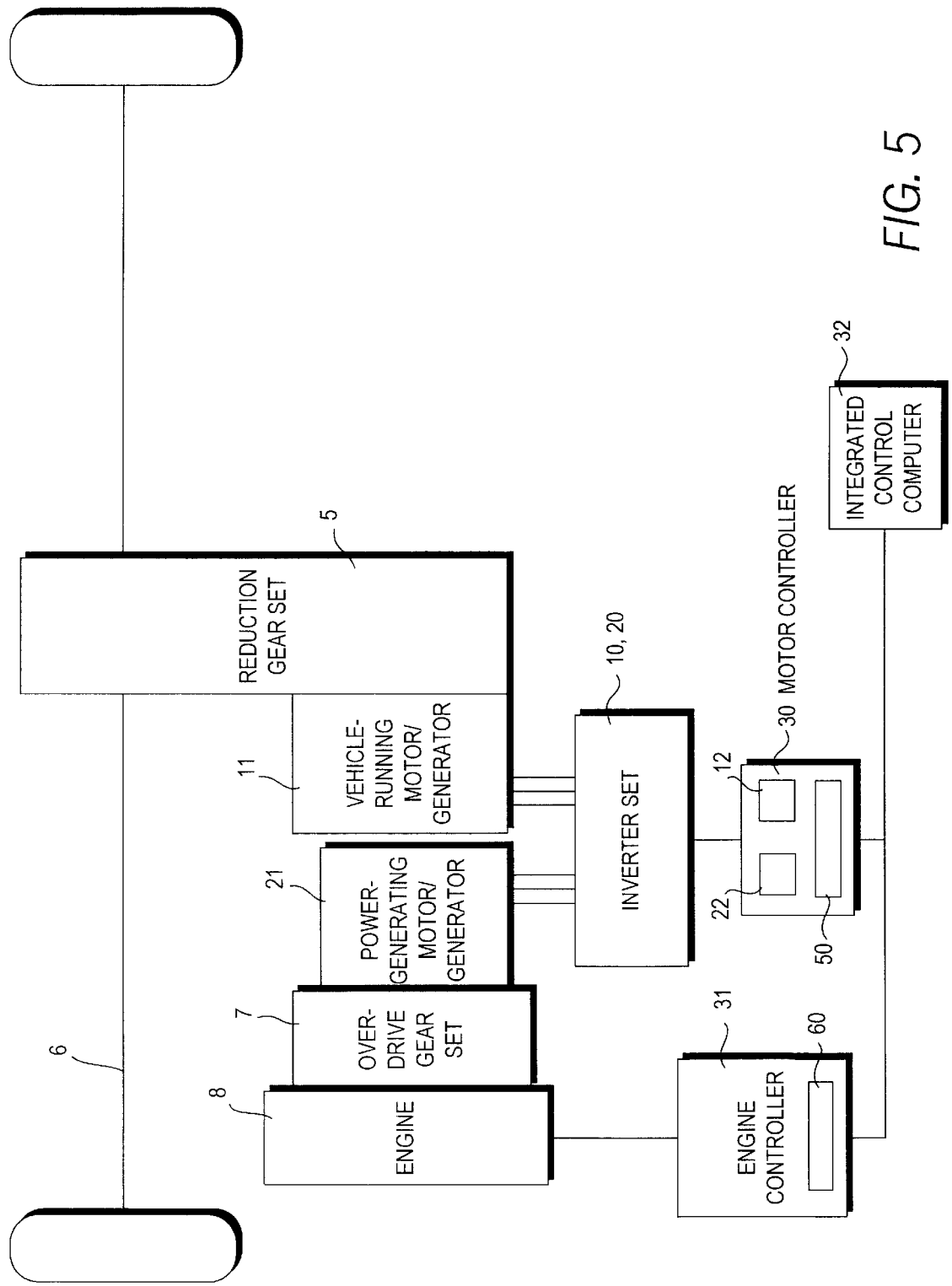
FIG. 5 is a schematic diagram of the drive system of a hybrid vehicle applying this invention.

A hybrid vehicle adapting the motor/generator control device of the present invention will be described below with reference to FIG. 5.

The hybrid vehicle mounts two motor/generators. The drive wheels of the vehicle are driven by the vehicle-running motor/generator 11. The engine 8 generates power and drives the power-generating motor/generator 21. The vehicle-running motor/generator 11 is connected to the shaft 6 through a reduction gear set 5. On the other hand, the power-generating motor/generator 21 is connected to the engine 8 through an over-drive gear set 7. The hybrid vehicle is provided with two motor/generators 11, 21 with inverter set (first inverter 10 and second inverter 20) connected to the motor/generators.

The two inverters are controlled by a motor controller 30 comprising a microprocessor 50, a first inverter control circuit 12 and a second inverter control circuit 22. The first inverter control circuit 12 and the second inverter control circuit 22 may be included in the microprocessor 50. Furthermore the engine controller 31 which is provided with a microprocessor 60 controls the engine 8. Furthermore a microprocessor-based integrated control computer 32 integrates control of the motor controller 30 and the engine controller 31.

When the maximum rotation speed of the engine 8 differs from the maximum rotation speed of the vehicle-running motor/generator 11, the over-drive gear 7 provided between the power-generating motor/generator 21 and the engine 8 equalizes both maximum rotation speeds by varying the gear ratio. In this manner, the over-drive gear 7 can match the fundamental frequency of the first and second control currents when the two motor/generators 11, 21 are rotating at a maximum rotation speed.

Figure 6:
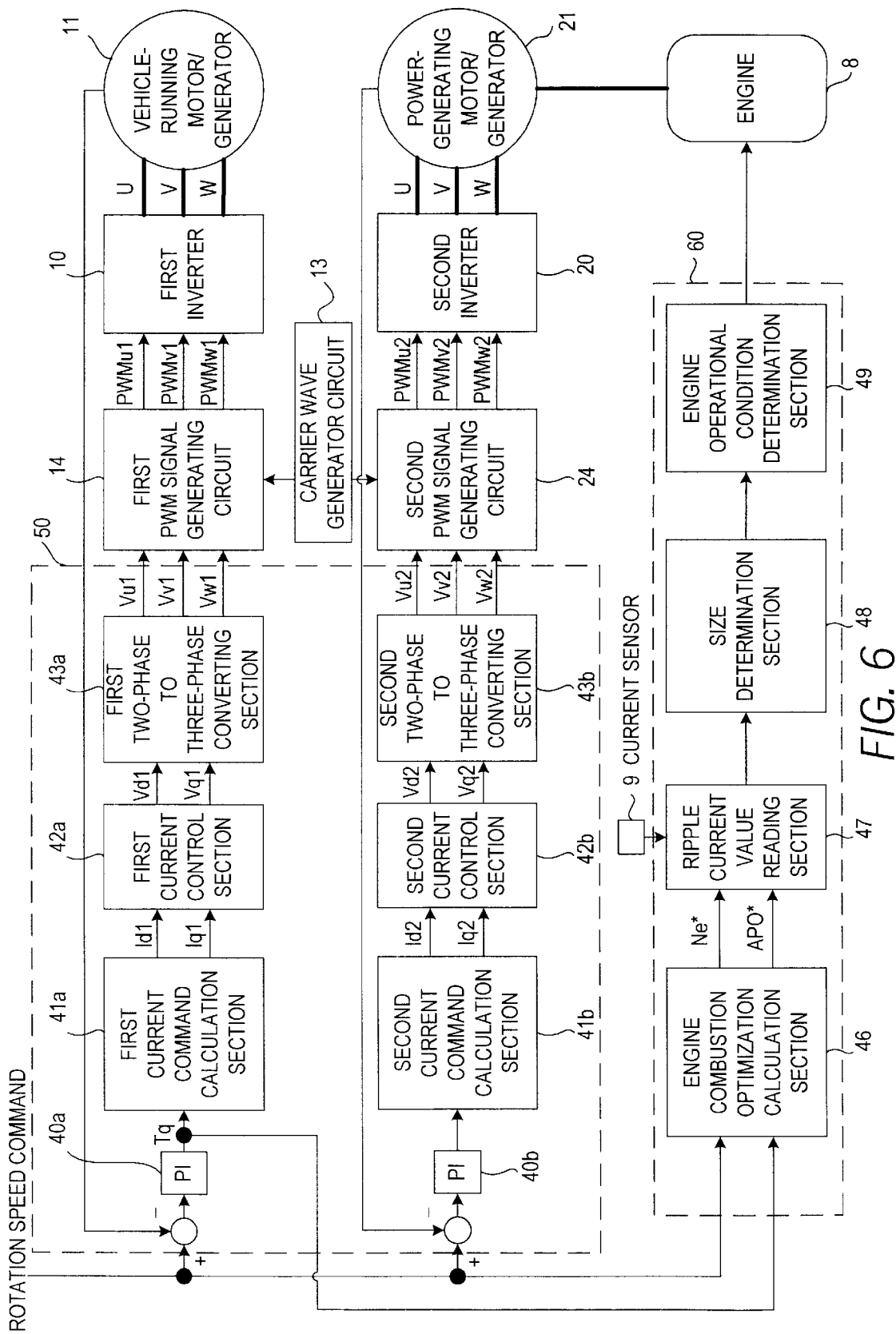
FIG. 6 is a block diagram describing control of motor/generators according to the embodiments of this invention.

The control of the motor/generators according to the present invention will be described below with reference to the control block diagram in FIG. 6.

The vehicle-running motor/generator 11 and the power-generating motor/generator 21 are controlled by known vector control. The rotation speed command signal from the integrated control computer 32 is converted to a torque command signal (Tq) by a first PI control section 40a based on the deviation from the motor rotation speed signal N1 of the vehicle-running motor/generator 11. The torque command signal is input to a first current command calculation section 41a and is converted to a d-axis current signal (Id1) (excitation current command signal) and a q-axis current signal (Iq1) (torque current command signal). Here, the d–q axes are a rotation coordinate system which rotates in synchronization with the rotating element of the first motor/generator.

After the first current control section 42a converts the d-axis current signal and the q-axis current signal to a d-axis voltage signal (Vd1) and a q-axis voltage signal (Vq1), the d-axis voltage signal and the q-axis voltage signal are converted to a first U-phase voltage command signal (Vu1), a first V-phase voltage command signal (Vv1), and a first W-phase voltage command signal (Vw1) by a first two-phase to three-phase converting section 43a. Furthermore a first PWM signal generating circuit, that is to say, a first IGBT drive circuit 14 converts the first voltage command signal for each phase to a first U-phase PWM signal (PWMu1), a first V-phase PWM signal (PWMv1) or a first W-phase PWM signal (PWMw1) by comparing the first voltage command signal for each phase with the carrier signal (triangular wave) from the carrier wave generator circuit 13. The first inverter 10 generates a voltage in the U-phase, the V-phase or the W-phase which is applied to the vehicle-running motor/generator 11 based on the first PWM signal in each phase.

In the same manner, a rotation speed command signal from the integrated control computer 32 is converted to a torque command signal by the second PI control section 40b based on the deviation from the generator rotation speed signal N2. A voltage signal in U-phase, V-phase or W-phase to the power-generating motor/generator 21 is generated by the current command calculation section 41b, the second current control section 42b, the second two-phase to three-phase converter 43b, the second PWM signal generating circuit, that is to say, the second IGBT drive circuit 24 and the inverter 20.

A second PWM signal generating circuit 24 converts the second voltage command signal for each phase to a second U-phase PWM signal, a second V-phase PWM signal or a second W-phase PWM signal by comparing the second voltage command signal for each phase with the carrier signal from the carrier wave generator circuit 13. Since the carrier signal used in the second PWM signal generating circuit 20 is the same as the carrier signal used in the first PWM signal generating circuit 14, they have the same phase and period.

The sections 40a–43a and the sections 40b–43b are virtually composed by the microprocessor 50 of the motor controller 30. That is to say, the microprocessor 50 of the motor controller 30 actually executes the control process of the sections 40a–43a and the sections 40b–43b. The first and second PWM signal generating circuit 14, 24 and the carrier wave generator circuit 13 may be included in the microprocessor 50.

The engine rotation speed Ne* and the engine throttle opening APO* to optimize the fuel efficiency of the engine 8 are determined by an engine combustion optimization calculation section 46 on the basis of the torque command signal of the vehicle-running motor/generator 11 and the rotation speed command signal from the integrated control computer 32. Thereafter it is determined in a size determination section 48 whether or not the ripple current is greater than a threshold value based on the ripple current read by the ripple current value reading section 47. The threshold value is preset so that ripple currents which are smaller than the threshold value do not damage electronic components in the motor/generator control circuit of the control device. The ripple current is detected by a current sensor 9 provided on the common DC bus lines as shown in FIG. 1 and FIG. 2. The engine rotation speed and the throttle opening are determined by the engine operational condition determination section 49 and sent to the power-generating engine 8 which drives the power-generating motor/generator 21.

The sections 46–49 are virtually constituted from the functions of a microprocessor 60 in the engine controller 31. That is to say, the microprocessor 60 in the engine controller 31 executes a control process in the sections 46–49.

Normally the engine controller 31 controls the engine 8 to allow operation at a rotation speed displaying maximum heat efficiency and to generate electrical power which is greater than the power consumed by the vehicle-running motor/generator 11 on the basis of a torque command value and the rotation speed applied to the vehicle-running motor/generator 11. However when the root-mean-square value of the ripple current exceeds the permissible range of the electronic components (the smoothing condenser 4, the noise filter 3, the switching elements sw11–sw16, sw21–sw26), the engine controller 31 determines a rotation speed (that is to say, a throttle opening) for the engine 9 in order to reduce the ripple current. This is achieved by matching the fundamental frequency of the control current of the power-generating motor/generator 21 with the fundamental frequency of the control current of the vehicle-running motor/generator 11.

In a hybrid vehicle mounting two motor/generators, driving the vehicle drive wheels with a vehicle-running motor/generator 11 and generating power by rotating the power-generating motor/generator 21 with an engine, a certain freedom is allowed with respect to the setting of the rotation speed of the power-generating motor/generator 21 in contrast to the setting of the rotation speed of the vehicle-running motor/generator 11 which must be controlled in response to the requirements of the driver operating the vehicle. The rotation speed of the power-generating motor/generator 21 is normally controlled in response to the power consumed by the vehicle-running motor/generator 11 which acts as a target value for the generation of power. On the other hand, when the ripple current in the common DC bus lines exceeds the threshold value, the rotation speed of the power-generating motor/generator 21 is controlled so that the fundamental frequencies of the control currents of both motor/generators 11, 21 approach one another and a decrease effect in the ripple current is obtained.

As shown above, according to the invention, in consideration of the size of the root-mean-square value of the ripple current, an engine controller determines a rotation speed operating an engine so that the fundamental frequency of the control current of a vehicle-running motor/generator 11 matches the fundamental frequency of the control current of a power-generating motor/generator 21. Therefore it is possible to reduce the ripple current while minimizing deterioration in energy efficiency without allowing the thermal efficiency of the engine to undergo large deviations from desirable operational conditions. Thus it is possible to reduce the size of the switching elements, the reactor (noise filter 3) and the smoothing condenser 4. Furthermore the required generated power for operating the vehicle-running motor/generator 11 is normally maintained and the reduction on the ripple current can be maintained under conditions which could result in particularly large ripple currents.

In the embodiments described above, the vehicle-running motor/generator 11 is always in a power consumption state where the vehicle-running motor/generator 11 operates as a motor, and that the power-generating motor/generator 21 is in a power generation state where the power-generating motor/generator 21 operates as a generator. However, the vehicle-running motor/generator 11 may operate as a generator, and the power-generating motor/generator 21 may operate as a motor in some cases. Hence, although the first and second carrier signals are normally synchronized, when the two motor/generators are in a power consumption state when running together or both in a power generation state, the synchronization of the two carrier signals is released and they are used in a non-synchronized state.

The entire contents of Japanese Patent Applications P2000-266899 (filed Sep. 4, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control device for motor/generators comprising:
   a first inverter connected to a direct-current (DC) power source through DC bus lines, the first inverter applying a control current to a first motor/generator which is used mainly as a motor;
   a second inverter connected to the direct-current power source through the DC bus lines, the second inverter applying a control current to a second motor/generator which is used mainly as a generator; the second inverter having the same configuration of switching elements as the first inverter;
   a first PWM signal generating circuit comparing a first carrier signal limiting the operational frequency of the first inverter with a first voltage command signal for establishing a desired control current of the first motor/generator, the first PWM signal generating circuit generating pulse width modulation (PWM) signals each operating one of the switching elements of the first inverter; and
   a second PWM signal generating circuit for comparing a second carrier signal with a second voltage command signal and generating pulse width modulation (PWM) signals each operating one of switching elements of the second inverter; the second carrier signal having the same period as the first carrier signal and limiting the operational frequency of the second inverter, the second voltage command signal establishing a desired control current of the second motor/generator;
   the first PWM signal generating circuit and the second PWM signal generating circuit controlling the first inverter and the second inverter respectively so that the operation of the first inverter is synchronized with the operation of the second inverter and so that the current of the first inverter which flows in the DC bus lines flows in an opposite direction to the current of the second inverter which flows in the DC bus line.

2. The control device for motor/generators according to claim 1 wherein the current of the first inverter and the current of the second inverter are generated simultaneously in opposite directions by operating the switching element of the first inverter and the corresponding switching element of the second inverter simultaneously.

3. The control device for motor/generators according to claim 1 wherein the first carrier signal and the second carrier signal have the same period and phase.

4. The control device for motor/generators according to claim 1 wherein the first carrier signal and the second carrier signal are generated from a carrier wave generator circuit.

5. The control device for motor/generators according to claim 1 wherein the product of the pole number and the maximum rotation speed of the first motor/generator is approximately equal to the product of the pole number and the maximum rotation speed of the second motor/generator.

6. The control device for motor/generators according to claim 1 wherein a microprocessor is provided for controlling an engine connected to the second motor/generator, when the ripple current in the DC bus line exceeds a threshold value, the microprocessor controlling the rotation speed of the second motor/generator so that the period of the fundamental frequency of the control current of the second motor/generator approaches the period of the fundamental frequency of the control current of the first motor/generator, and otherwise the microprocessor controlling the rotation speed of the second motor/generator in response to a target value for generated power.

7. The control device for motor/generators according to claim 1 wherein the switching elements of the first inverter and the switching elements of the second inverter are connected to the direct current power source through a common smoothing condenser, and the inductance of the route from the smoothing condenser and each the switching element of the first inverter is approximately equal to the inductance of the route from the smoothing condenser and the corresponding switching element of the second inverter.

* * * * *